United States Patent
Phillips

(10) Patent No.: US 8,382,279 B2
(45) Date of Patent: Feb. 26, 2013

(54) EYE PATCH FOR GLASSES

(76) Inventor: Kimberly Sue Phillips, Morris, IL (US)

( * ) Notice: Subject to any disclaimer, the term of this patent is extended or adjusted under 35 U.S.C. 154(b) by 1 day.

(21) Appl. No.: 13/239,225

(22) Filed: Sep. 21, 2011

(65) Prior Publication Data

US 2012/0069290 A1  Mar. 22, 2012

Related U.S. Application Data

(60) Provisional application No. 61/403,676, filed on Sep. 21, 2010.

(51) Int. Cl.
*A61B 1/00* (2006.01)

(52) U.S. Cl. ............ 351/158; 351/46; 128/857; 128/858

(58) Field of Classification Search .................. 351/158, 351/46, 45, 121, 111, 41; 2/15, 13, 9; 128/857, 128/858; D24/189, 105
See application file for complete search history.

(56) References Cited

U.S. PATENT DOCUMENTS

| | | | | |
|---|---|---|---|---|
| 5,402,189 A * | 3/1995 | Gill | ................................. | 351/44 |
| 5,927,279 A * | 7/1999 | Oviatt | ........................... | 128/857 |
| D466,610 S * | 12/2002 | Ashton et al. | ................ | D24/189 |
| 7,201,479 B2 * | 4/2007 | Spitzer | ........................... | 351/158 |
| 7,318,440 B1 * | 1/2008 | Grijalva | ........................ | 128/858 |

* cited by examiner

*Primary Examiner* — Hung Dang
(74) *Attorney, Agent, or Firm* — Justin Lampel

(57) ABSTRACT

The present invention generally relates to an adjustable eye patch for use in connection with eye glasses. The eye patch has a first end and a second end. While in use, the first end may be located near the nose of an individual and the second end may be positioned near the ear of the individual. Near the second end of the eye patch may be a plurality of slits wherein a support bar portion of the frame of the glasses may be inserted. The first end of the eye patch may have an elongated slit for securing around the bridge or nose support of the eye glasses. The elongated slit may be temporarily secured around the bridge of the glasses to provide additional support for the eye patch.

7 Claims, 2 Drawing Sheets

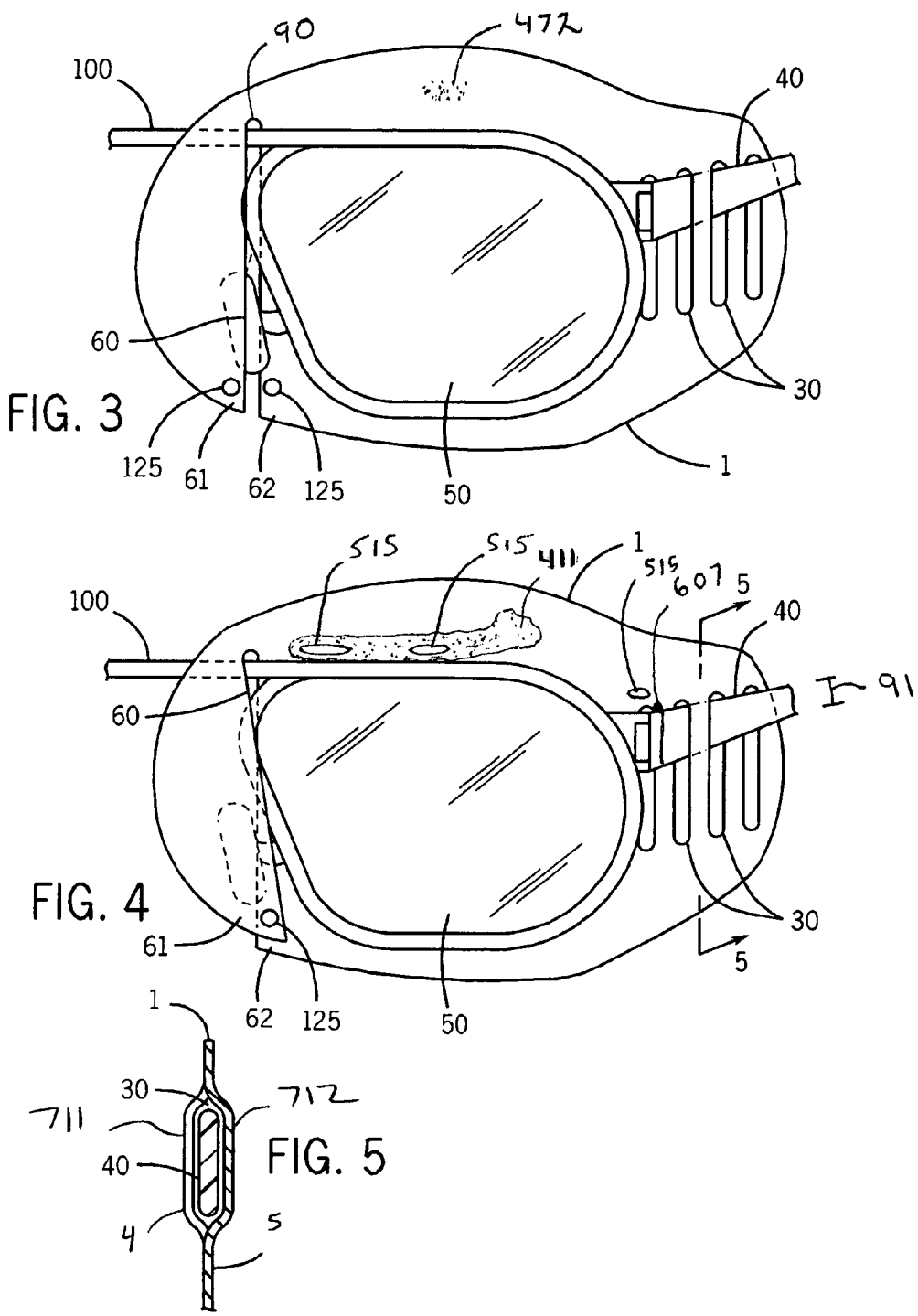

EYE PATCH FOR GLASSES

RELATED APPLICATIONS

The present application is based on U.S. provisional application No. 61/403,676 filed on Sep. 21, 2010, the entire contents of which are incorporated by reference. Applicant claims the priority benefit of the '676 application.

BACKGROUND OF THE INVENTION

Is The present invention generally relates to an adjustable eye patch for use in connection with eye glasses. The eye patch has a first end and a second end. While in use, the first end may be located near the nose of an individual and the second end may be positioned near the ear of the individual. Near the second end of the eye patch may be a plurality of slits wherein a support bar portion of the frame of the glasses may be inserted. The first end of the eye patch may have an elongated slit for securing around the bridge or nose support of the eye glasses. The elongated slit may be temporarily secured around the bridge of the glasses to provide additional support for the eye patch.

An eye patch or eye pad is a small patch that is worn in front of one eye. It may be a cloth patch attached around the head by an elastic band or by a string, or an adhesive bandage. It is often worn by people to cover a lost or injured eye, but it also has a therapeutic use in children for the treatment of amblyopia.

Over the years, eye patches have been made for use in connection with eye glasses. For example, U.S. Pat. No. 5,927,279 to Oviatt discloses an eye patch including a substantially planar flexible elongate body having a first end and a second end. At least one transverse slot extends through the body adjacent each of the first end and the second end. The body is mounted onto a pair of eye glasses by extending an arm through one slot and a nose pad through the other slot. When in position the body extends across a lens receiving socket to block vision through a lens and extends substantially along the arm to block peripheral vision.

U.S. Pat. No. 5,402,189 to Gill discloses a side shield for eyeglasses includes a metal foil shape-retentive member sandwiched between a neoprene base layer and an ornamental fabric cover layer. The shape-retentive member includes first and second arcuate lobe ends connected by a reduced width medial neck portion. Two pair of slits formed through the base and cover layers on opposite sides of the medial neck portion allows the shield to be slipped onto a temple region of an eyeglass earbow, without contact between the shape-retentive member and the earbow, and thereafter deformed to a custom configuration by a user to block peripheral light and wind. In a method of making the side shields, a plurality of preformed shape-retentive members are laminated to a neoprene base sheet. A fabric cover sheet is then laminated in overlying relation to the shape-retentive members and the base sheet to form a three layer laminate sheet. Specially configured dies or other cutting techniques are then used to cut mirror image left and right hand side shields from the laminate sheet.

However, these eye patches fail to disclose an adjustable eye patch for use in connection with eye glasses which work in an easy and convenient manner. A need, therefore, exists for an improved eye patch for use in connection with eye glasses.

SUMMARY OF THE INVENTION

The present invention generally relates to an adjustable eye patch for use in connection with eye glasses. The eye patch has a first end and a second end. While in use, the first end may be located near the nose of an individual and the second end may be positioned near the ear of the individual. Near the second end of the eye patch may be a plurality of slits wherein a support bar portion of the frame of the glasses may be inserted. The first end of the eye patch may have an elongated slit for securing around the bridge or nose support of the eye glasses. The elongated slit may be temporarily secured around the bridge of the glasses to provide additional support for the eye patch. An advantage of the present invention is to provide an adjustable eye patch for use in connection with a pair of eye glasses.

Yet another advantage of the present invention is to provide an adjustable eye patch which is suitable for use with metal or plastic frames.

And another advantage of the present invention is to provide an adjustable eye patch which can be used on glasses having a nose support or glasses free of a nose support.

Still another advantage of the present invention is to provide an adjustable eye patch which is easy to produce.

And yet another advantage of the present invention is to provide an adjustable eye patch which is easy to transport and store. Yet another advantage of the present invention is to provide an adjustable eye patch which is easily cleaned in, for example, a typical washing machine.

Still another advantage of the present invention is to provide an adjustable eye patch which is light-weight.

For a more complete understanding of the above listed features and advantages of the adjustable eye patch reference should be made to the following detailed description of the preferred embodiments and to the accompanying drawings.

BRIEF DESCRIPTION OF THE DRAWING

FIG. 3 illustrates a front view of the adjustable eye patch inserted on a pair of eye glasses wherein the first flap and second flap are not secured together.

FIG. 4 illustrates a front view of the device wherein the first flap and second flap are secured together.

FIG. 5 illustrates a side cross sectional view of the adjustable eye patch.

DETAILED DESCRIPTION OF THE PREFERRED EMBODIMENTS

The present invention generally relates to an adjustable eye patch for use in connection with eye glasses. The eye patch has a first end and a second end. While in use, the first end may be located near the nose of an individual and the second end may be positioned near the ear of the individual. Near the second end of the eye patch may be a plurality of slits wherein a support bar portion of the frame of the glasses may be inserted. The first end of the eye patch may have an elongated slit for securing around the bridge or nose support of the eye glasses. The elongated slit may be temporarily secured around the bridge of the glasses to provide additional support for the eye patch.

Figure 1:
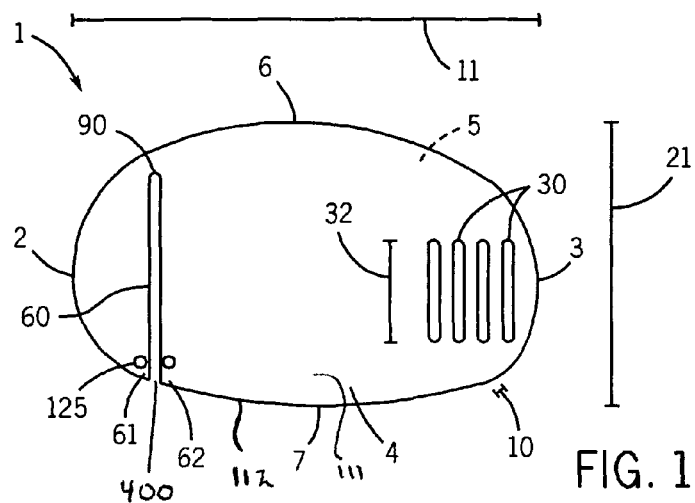
FIG. 1 illustrates a front view of the adjustable eye patch.
Figure 2:
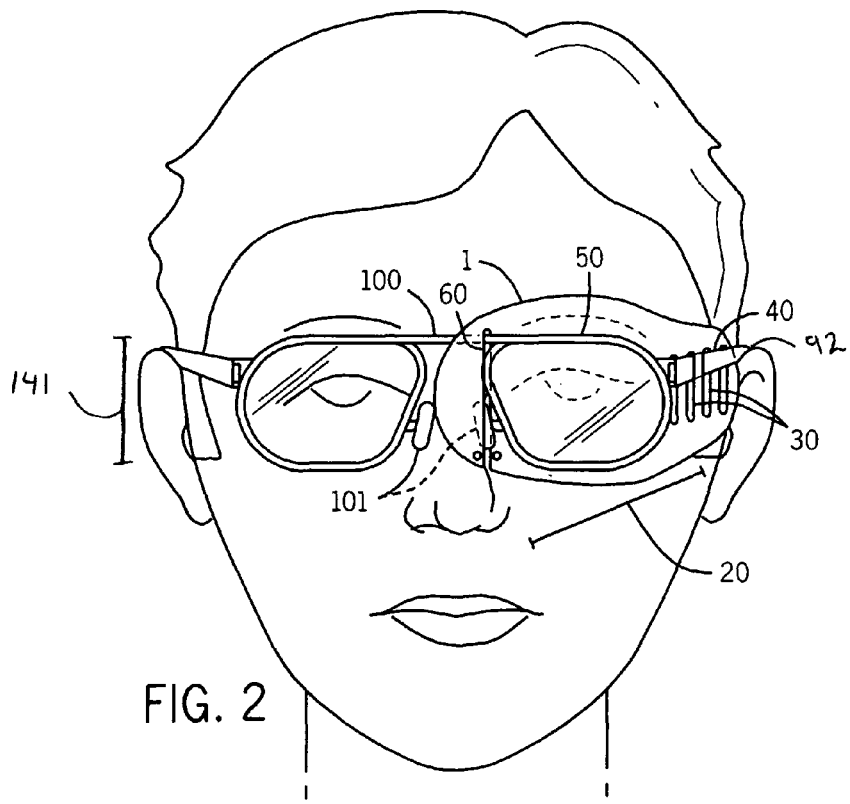
FIG. 2 illustrates a front view of the adjustable eye patch wherein the eye patch is inserted on a frame of a pair of eye glasses.

Referring now to the drawings wherein like figures refer to like parts, FIG. 1 generally illustrates an adjustable eye patch 1 for use in connection with a pair of eye glasses 50. The adjustable eye patch may have a first end 2, a second end 3, a front surface 4, a back surface 5, a top 6 and a bottom 7. Further, the adjustable eye patch 1 may have a perimeter portion 112 defining an interior surface area 111 of the perimeter portion 112. In an embodiment, the adjustable eye patch 1 may have an antibacterial agent chemical 472 located on the eye patch 1 so as to provide a clean and sterile environment for the wearer. The adjustable eye patch 1 may further have a width 10 and a length 11; the length 11 being equal to the distance between the first end 2 and the second end 3. The length 11 may be substantially similar to an average length 20 (FIG. 2) between a nose of a person to an area roughly half-way between the exterior edge of an eye and the ear of the person. Although the images show the device 1 being used on the right side of the glasses 50, the device 1 may be used on either the right side or the left side of the glasses 50.

The adjustable eye patch 1 may further have a height 21 defined by the distance between the top 6 and the bottom 7 of the eye patch 1. The height 21 of the adjustable eye patch 1 may be slightly larger than a height 141 of the typical pair of eye glasses 50 (including the lenses).

The eye patch 1 of the present invention may be made from numerous types of materials; however, the eye patch 1 of the present invention is preferably made from a cloth or fabric so as to be highly flexible and to provide a smooth surface for contacting the face, and possibly eye, of the wearer. Preferably, the adjustable eye patch 1 is made from a material which is easily cleaned. The adjustable eye patch 1 may be preferably cleaned in, for example, a typical washing machine, so as to provide a clean environment around the eye of a wearer. Alternatively, the adjustable eye patch 1 may be easily hand washed. Preferably, the adjustable eye patch 1 is air dried after washing; but may be dried in a machine depending on the material used to create the adjustable eye patch 1. The adjustable eye patch 1 of the present invention may have a plurality of vertical rectangular slits 30 located near the second end 3 of the eye patch 1. The plurality of vertical rectangular slits 30 are located completely within the front surface 4 and back surface 5 of the eye patch 1. Further, an object may pass through the plurality of vertical rectangular slits 30 from the front surface 4 to the back surface 5. The figures illustrate four slits 30; however, any number of slits 30 may be used such that the user may more easily fit the adjustable eye patch 1 over a wide range of sizes and styles of glasses 50. The plurality of slits 30 may have a length 32 which may be greater than a height 91 of a support bar portion 40 of the frame of the glasses 50; wherein the support bar portion 40 of the glasses 50 may have an end 92. As a result, the support bar portion 40 (which goes over the ear of a person) of the eye glasses 50 may easily, but firmly, slide through the at least one of the slits 30.

As stated above, the adjustable eye patch 1 may have at least two slits 30 located near the second end 3 of the patch 1. The support bar portion 40 of the glasses 50 may slide into one slit 30 and out of another of the plurality of slits 30. More specifically, the support bar portion 40 may first slide through, for example, one of the inner slits 30 (the slits 30 closest to the nose of the person) from the front 4 of the patch 1 toward the back 5 of the adjustable eye patch 1. Once the end 92 (FIG. 2) of the support bar portion 40 passes through one of the first slits 30 of the eye patch 1, the flexible material of the adjustable eye patch 1 may be bent so that the end 92 of the support bar portion 40 then moves through a second slit 30 from the back 5 of the patch 1 toward the front 4 of the adjustable eye patch 1. As a result, only a small portion of the support bar portion 40 may be visible from the back 5 of the adjustable eye patch 1 whereas the remainder of the support bar portion 40 and eye glasses 50 remain on the front 4 side of the patch 1 during use.

Located near the first end 2 of the adjustable eye patch 1 may be a single elongated slit 60. The single elongated slit 60 may have a first end 90 and a second end 400. The fist end 90 of the single elongated slit 60 may extend from near the upper-middle of the height 21 of the adjustable eye patch 1 (toward the top 6) all the way through the bottom 7 of the adjustable eye patch 1. More specifically, the first end 90 of the elongated slit 60 may be located within the interior area 111 of the eye patch 1 wherein as the second end 400 of the elongated slit 60 extends all the way to the bottom 7 of the adjustable eye patch and terminates at the perimeter 112 of the eye patch 1. Accordingly, the elongated slit 60 may produce a first flap 61 and a second flap 62 of the eye patch 1.

After the support bar portion 40 of the glasses 40 is inserted though at least one of the plurality of slits 30 (the second end 3 of the eye patch 1 is therein secured around the support bar 40 of the eye glasses 50), the first end 2 of the eye patch 1 may then be secured around the glasses 50 as well. More specifically, the elongated slit 60 may first be placed over the bridge 100 or nose support 101 of the eye glasses 50 so that the bridge 100 or nose support 101 is brought through the elongated slit 60 of the adjustable eye patch 1. The first end 90 of the elongated slit 60 may then partly rest on the bridge 100 or nose support 101 of the glass and be held in place by, for example, gravity.

Once the first end 90 of the elongated slit 60 is secured over the bridge 100 or nose support 101, the first flap 61 of the eye patch is located on one side of the bridge 100 or nose support 101 whereas the second flap 62 is located on the opposite side of the bridge 100 or nose support 101. The adjustable eye patch 1 may then hang freely around the bridge 100 or nose support 101 and be worn and held in place by, for example, gravity and or friction.

In the preferred embodiment, the first flap 61 and the second flap 62 are secured together after the bridge 100 or nose support 101 passes through the elongated slit 60. More specifically, the first flap 61 may be secured to the second flap 62 by, for example, opposing magnets located within an interior of the flaps. Alternatively, the first flap 61 and the second flap 62 may be secured together by, for example, opposing hook and loop fasteners located on the flaps, opposing buttons (including snap buttons) located on the flaps, a Zipper, or a temporary adhesive of the like (the securing mechanism) 125. By way of example, the Figures show snap buttons being used as the securing mechanism 125.

As stated above, the first flap 61 and second flap 62 may be secured around the bridge 100 or nose support 101 of the glasses 50 thereby forming a secured and sealed perimeter. Once the first flap 61 and second flap 62 are secured together via the securing mechanism 125, the glasses 50 may be prevented from sliding out of the elongated slit 60 in a vertical manner. Regardless of the securing mechanism, the securing mechanism 125 used is generally temporary in nature so that the adjustable eye patch 1 may be removed from the glasses 50 after the eye has healed and the patch 1 is no longer needed. It should be understood that alternative means for securing the first flap 61 to the second flap 62 may be used and are intended to be covered by the present invention. Referring now to FIG. 5, in an embodiment, the eye patch 1 is reversible such that a pattern 711 on the front 4 of the eye patch 1 may be different from a pattern 712 on the back 5 of the eye patch 1. As a result, the user may elect to display alternative patterns by reversing the eye patch 1 depending on the style of the patterns and/or the eye for which the eye patch 1 is used in connection with. The adjustable eye patch 1 may further have an interior 411 (FIG. 4) located between the front 4 and the back 5 of the eye patch 1. The interior 411 is generally not visible or accessible by the user. In an embodiment, within the interior 411 of the eye patch 1 may be at least one magnet 515. The magnet 515 may be attracted to the frame of metal glasses 50 such that the magnet 515 further provide stability to the eye patch 1 when the eye patch 1 is in use on the glasses 50. In an embodiment, magnets 515 may further be located near a screw 607 (FIG. 3) of the glasses 50 in plastic glasses.

To remove the adjustable eye patch 1 from the eye glasses 50, the securing procedure is reversed (the securing mechanism 125 is first unsecured). First the first flap 61 is unsecured from the second flap 62 and the bridge 100 or nose support 101 is removed from the elongated slit 60. The support bar portion 40 of the glasses 50 is then pulled away from and removed from the slits 30 and the glasses 50 are free from the adjustable eye patch 1.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. An adjustable eye patch for use on a pair of eye glasses, the eye patch comprising:
    a top, a bottom, a first side, a second side, a front surface and a back surface wherein the top, the bottom, the first side and the second side generally form a perimeter,
    an interior,
    a plurality of vertical rectangular slits located on the front surface extending through to the back surface wherein an object may pass through the vertical rectangular slits from the front surface to the back surface and wherein the plurality of vertical rectangular slits are located near the second side of the eye patch; and
    a solo elongated vertical rectangular slit having a first end and a second end wherein the first end of the solo elongated vertical rectangular slit is located within perimeter of the eye patch and wherein the second end of the solo elongated vertical rectangular slit is located directly at the perimeter and wherein the second end of the solo elongated vertical rectangular slit divides a portion of the perimeter of the eye patch into a first flap and a second flap.

2. The adjustable eye patch of claim 1 further comprising:
    a magnet located within the inaccessible interior of the eye patch wherein the magnet is attracted to a metal frame of the pair of eye glasses and wherein the magnet secures the eye patch to the eye glasses.

3. The adjustable eye patch of claim 1 further comprising:
    a magnet located within the inaccessible interior of the eye patch wherein the magnet is attracted to a screw of a plastic pair of eye glasses and wherein the magnet secures the eye patch to the eye glasses.

4. The adjustable eye patch of claim 1 further comprising:
    a securing mechanism located on the first flap and a corresponding securing mechanism located on the second flap wherein securing mechanism of the first flap is temporarily secured to the securing mechanism of the second flap and wherein the securing mechanism seals the perimeter of the eye patch.

5. The adjustable eye patch of claim 4 wherein the securing mechanism secures the first flap to the second flap and wherein the solo elongated vertical rectangular slit is secured around a bridge of a pair of eye glasses.

6. The adjustable eye patch of claim 1 wherein a pattern on the front surface is distinct from a pattern on the back surface.

7. The adjustable eye patch of claim 1 wherein the eye patch may be worn in a reversible orientation between the front surface and the back surface.

* * * * *